Patented Jan. 7, 1947

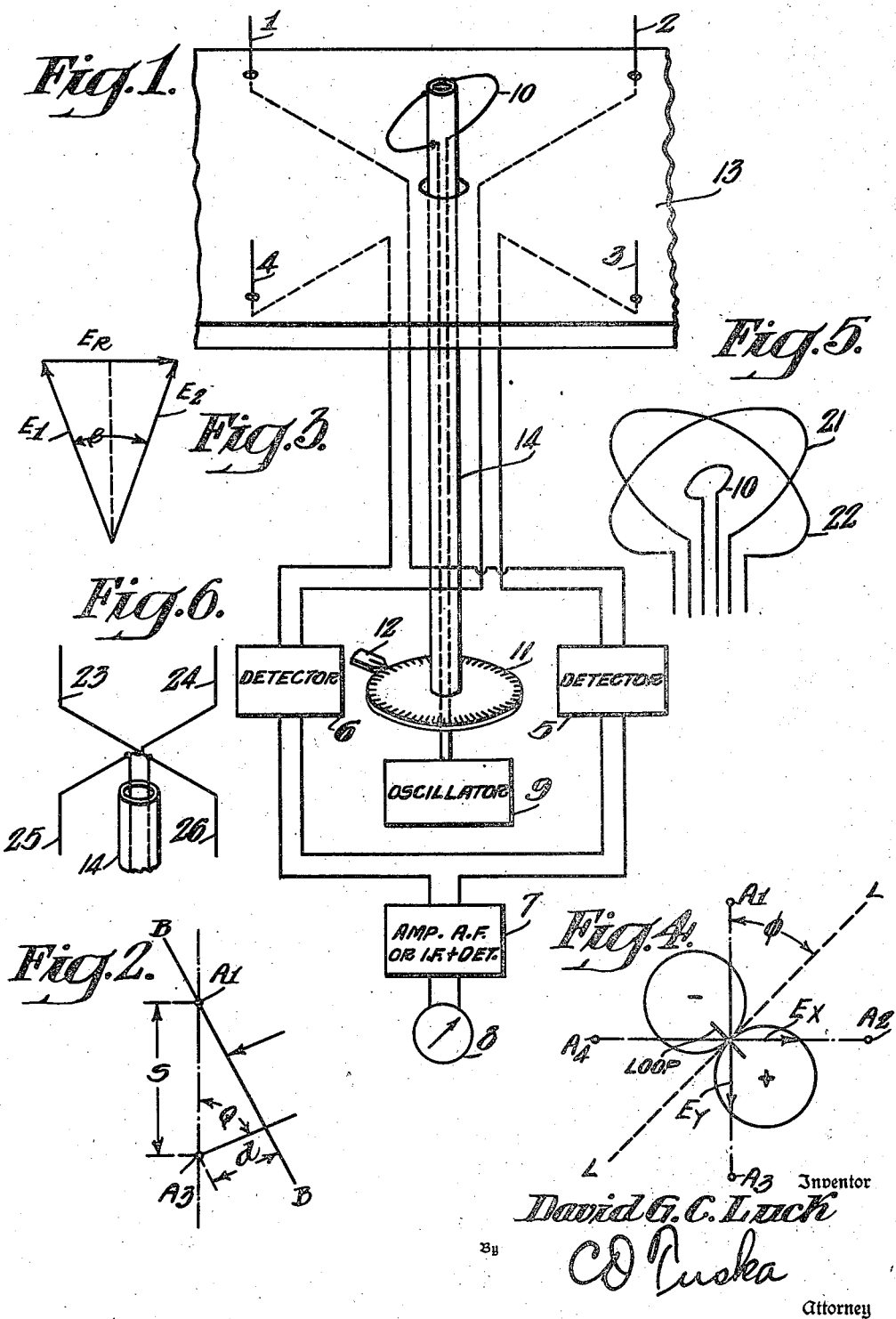

2,413,982

UNITED STATES PATENT OFFICE 2,413,982

DIRECTION FINDER

David G. C. Luck, Merchantville, N. J., assignor to Radio Corporation of America, a corporation of Delaware Application February 26, 1942, Serial No. 432,371

6 Claims. (Cl. 250—11)

This invention relates to direction finders, and particularly to those employing the shielded-U type of antenna array.

With an elevated H-type Adcock antenna pair, bearings may be taken simply by swinging the antenna. At the lower frequencies, with large, widely separated antennas, it is difficult mechanically to swing the antenna. Also the H-type system is electrically unsymmetrical to ground, so that it must be artificially balanced, and employs the parallel opposed type of connection which is critical to circuit impedances. The shielded U-type of Adcock is electrically symmetrical to ground and has its antennas connected in relatively uncritical series opposition. But it can, in any practical form, be rotated only with considerable difficulty. With a fixed, four antenna Adcock system, such as lends itself especially to shielded-U construction, a precise goniometer is ordinarily necessary to measure wave arrival directions and it may introduce critical circuit phasing conditions.

The principal object of the present invention is to provide a system for measuring bearings with a fixed antenna system. A further object is to provide means whereby the necessity of precision mechanical construction and circuit conditions is avoided without corresponding sacrifice in accuracy of the bearings obtained.

The present invention makes it possible to avoid precise mechanical and circuit requirements by directionally coupling energy from a local oscillator directly into the Adcock antennas, along with incoming signals of which the direction of arrival is required. By connecting the output of a small local oscillator symmetrically to a small, rotatable loop placed directly at the center of the Adcock antenna square, a directionally variable coupling is established. If the mixed local and distant signals from each of the crossed, series-opposed antenna pairs are separately rectified and the beat notes added, the amplitude of the resultant beat will pass through zero twice during a complete revolution of the loop, just as would the signal on a rotatable Adcock pair during a revolution of that pair. If local and distant signals are so related in frequency to the impedance characteristics of the radio frequency circuits that they are treated alike by these circuits, then the direction finder is substantially independent of radio frequency phase shifts, requiring for accuracy merely that the two antenna pairs and detectors have equal sensitivities.

The invention will be described by referring to the accompanying drawing in which Figure 1 is a schematic perspective view of the direction finder of the invention; Figures 2, 3 and 4 are vector and graphic diagrams used in describing the invention; Figures 5 and 6 illustrate modifications of the antenna array which may be substituted for the array shown in Figure 1.

Referring to Figure 1, four vertical antennas 1, 2, 3 and 4 represent a fixed Adcock system of the shielded U type erected above a ground or counterpoise 13. Each pair of opposing antennas is connected to a detector (5—6); one pair of antennas 1 and 3 are connected to the input terminals of the detector 5, and the other pair of antennas 2 and 4 are connected to the detector 6. The output circuits of the two detectors are connected in additive relation with each other and, through an amplifier 7, to any suitable indicating device, such as a meter 8.

A local oscillator 9, covering the desired frequency range, is connected symmetrically to a loop antenna 10, which may be relatively small as compared to the Adcock array. The loop 10 is positioned at the center of the square formed by the antennas of the Adcock array, and is arranged to be rotatable by any suitable means, such as a shaft 14. A calibrated scale 11 is mechanically connected to the loop 10 and rotates with it. A stationary pointer 12 is positioned adjacent the scale 11 to indicate the direction in which the axis of the loop is pointed.

The directive characteristic of an Adcock pair results from the fact that the voltages induced in the two antennas by an arriving wave differ in phase by an amount corresponding to the difference between the times of arrival of any particular part of the wave at the two antennas. Referring to Figure 2 of the drawing, points $A_1$ and $A_3$ represent the positions of two vertically extending antennas, spaced apart by a distance S. The line B—B represents any one part, for example, the crest of the horizontally travelling component of a wave approaching at an angle $\theta$ to the line $A_1$—$A_3$. At the time line B—B reaches the antenna at $A_1$, it still has a distance represented by $d$ to travel before it reaches the other antenna at $A_2$. Since this is equally true of each portion of the wave, the voltage in the antenna at $A_3$ will lag the voltage in the antenna at $A_1$ by the time required for the wave to travel a distance $d$. Expressed in radians, the phase angle between the two voltages is $$\frac{2\pi d}{\lambda}$$

where $\lambda$ represents the wavelength of the wave being received. A consideration of the diagram shows that $$d = s \cos \theta$$

and the phase angle, which will be called $\beta$, is $$2\pi \frac{s \cos \theta}{\lambda}$$

Referring to Figure 3, $E_1$ and $E_2$ are vectors representing the voltages induced in two spaced antennas by a wave approaching them at an angle to the line between them. Vectors $E_1$ and $E_2$ are of equal lengths, but differ in phase by an angle $\beta$. Now if the two antennas referred to are connected in series bucking relation to a common load circuit, the voltage $E_R$ at the load circuit will be represented by the difference between $E_2$ and $E_1$, which has an amplitude of $$E_R = 2E_1 \sin \frac{1}{2}\beta$$

when $$E_1 = E_2$$

Substituting for $\beta$ the value derived above, $$E_R = 2E_1 \sin \frac{1}{2}\left(\frac{2\pi s \cos \theta}{\lambda}\right)$$

When the antennas are closely spaced relative to the wavelength of the incoming signals, the angle $$\frac{1}{2}\frac{2\pi s \cos \theta}{\lambda}$$

is very small in comparison to an angle of one radian, and hence its sine is substantially equal to the angle itself. Assuming this to be true, $$E_R = E_1 \frac{2\pi s}{\lambda} \cos \theta$$

Thus the amplitude of the voltage at the output terminals of an Adcock pair is seen to be proportional to the cosine of the angle between the line through the two antennas and the direction of approach of the wave which produces the voltage.

In the fixed antenna Adcock systems two pairs of antennas are disposed along lines at right angles to each other. Using the line through one of these pairs as a reference direction, the amplitude of the voltage at the output terminals of that pair produced by a wave arriving from a distant source at an angle $\theta$ to the reference is proportional to $\cos \theta$. The amplitude of the voltage at the output terminals of the other pair is proportional to cosine $(90°-\theta)$, or $\sin \theta$. It is the relation between these two voltages which is used to give an indication of the bearing of an arriving wave. Ordinarily, the voltages are applied to the rectangularly disposed field coils of a goniometer, and produce a resultant field in the goniometer which corresponds in direction to the bearing of the incoming wave. A rotatable search coil is moved to the position of zero coupling with the resultant field, and this position, as indicated on a scale mechanically connected to the search coil, represents the bearing.

Any accidental difference in the phase shifts or attenuations of the signals conducted from the antenna pairs to the goniometer will result in incorrect bearing indications. The goniometer must be constructed with great precision, as well as the antennas and their lead-ins. Any radio frequency transformers or circuits between the antennas and the goniometer contribute to the probability of inequalities in the treatment of the signals reaching the goniometer from the two antenna pairs, and consequent inaccuracy of the system.

The aforementioned difficulties are avoided in the present invention by radiating locally a signal at a frequency differing somewhat from the frequency of the arriving signal, the bearing of which is to be determined. The local signal is radiated directionally by a small loop lying in a vertical plane and rotatable about a vertical axis equidistant from the four Adcock antennas. Figure 4 represents the loop antenna, its radiation pattern, and vectors corresponding to the Adcock antenna voltages induced by the loop currents. The lengths of the vector lines $E_y$ and $E_x$ represent the amplitudes of the voltages which will be produced at the output terminals of two pairs of Adcock antennas located at points $A_1$, $A_3$ and $A_2$, $A_4$, respectively. These voltages are in time phase with each other because their point of origin is equally distant from each pair of antennas.

Taking line $A_1$—$A_3$ as a reference direction, and $\phi$ as the angle between the reference and the horizontal axis of the loop, the voltage amplitude $E_y$ is proportional to $\cos \phi$, and $E_x$ is proportional to $\sin \phi$. This is a result of the radiation pattern of the loop, which is recognized as equivalent to a figure-of-eight or polar diagram of the cosine function.

Thus there appears at the output terminal of antenna pair 1—3 (Fig. 1) a voltage having an amplitude proportional to $\cos \theta$ and the frequency of the remote source, and a voltage having an amplitude proportional to $\cos \phi$ and the frequency of the local oscillator. The amplitude of the beat between the local oscillator and the remote signal in the output circuit of the detector 5 is proportional to the product of the amplitudes of the two voltages applied to the detector input. The frequency of the beat is the difference between the frequencies of the local and remote signals. Representing the amplitude of the beat in the output of the detector 5 as $E_5$, $$E_5 = \cos \theta \cos \phi$$

Similarly, the beat appearing in the output of the detector 6 has an amplitude $$E_6 = \sin \theta \sin \phi$$

Since the output circuits of the two detectors are connected in series, the resultant amplitude of the beat voltage at the input terminals of the amplifier 7 is the algebraic sum of the products:

$$\cos \theta \cos \phi + \sin \theta \sin \phi$$

which equals $\cos (\theta - \phi)$, and is equal to zero for two values of $\phi$, i. e., $\theta \pm 90°$.

Thus by rotating the loop, the resultant beat can be made to go through changes in amplitude like those which would occur in the signal from a rotatable Adcock pair, and the position of the loop for a null in the amplitude of the beat is an indication of the direction from which the remote signal is approaching.

In order to obtain the advantages of superheterodyne operation, it may be desirable in some cases to use a local oscillator frequency differing from that of the remote signal by enough to produce an intermediate frequency beat, and an ordinary intermediate frequency amplifier following the detectors. The radio frequency circuits may then be tuned broadly since they need only be selective enough to suppress image reception, and this will result in any phase shift in the remote signal being substantially equalled by a phase shift in the local signal. The difference in phase between the two signals at each antenna, and hence the apparent bearings, will be unaffected. The Adcock array may be replaced by a pair of crossed loop antennas as shown in Fig. 5, where vertical loops 21 and 22 are positioned at right angles to each other and are connected to the remainder of the apparatus in the same manner as the Adcock pairs shown in Figure 1.

The central loop 10 of Figure 1 may be replaced by a small rotatable Adcock array, shown in Figure 6 as comprising spaced vertical antennas 23, 24, 25 and 26. The antennas may be connected as shown to down leads in the same manner as the loop 10 in Fig. 1.

I claim as my invention:

1. A radio direction finder including four antennas positioned at the corners of an imaginary square, two detectors, an indicator, each pair of diagonally opposed antennas being connected to the input circuit of one of said detectors, the output circuits of said detectors being connected with each other and with said indicator, an oscillator, and a rotatable loop antenna connected to said oscillator and positioned in a vertical plane with its axis of rotation extending vertically through the center of said square.

2. A radio direction finder including a four antenna Adcock array, two detectors, one connected to each antenna pair of said array, an indicator connected with output terminals of said detectors in additive relation, an oscillator, and a loop antenna connected to said oscillator and positioned in a vertical plane and rotatable about a vertical axis through the center of said Adcock array.

3. A radio direction finder including means for deriving from an arriving wave two voltages having amplitudes proportional respectively to the sine and the cosine of the bearing of said arriving wave, means for deriving from a directive local source of radiation two voltages having amplitudes proportional respectively to the sine and the cosine of the direction along which said local source is positioned, said second two voltages being oscillatory at a different frequency from said first two voltages, means for beating said sine component voltages together to obtain a beat frequency voltage having an amplitude proportional to the product of the amplitudes of said sine component voltages, means for beating said cosine component voltages together to obtain a beat frequency voltage having an amplitude proportional to the product of the amplitudes of said cosine component voltages, means for indicating the sum of said beat frequency voltages, and means for changing the direction along which said local source is positioned.

4. A radio direction finder including a four antenna Adcock array connected to derive from an arriving wave two voltages having amplitudes proportional respectively to the cosine and to the sine of the bearing of said arriving wave, a local oscillator connected to a rotatable directive antenna arranged to produce at the output terminals of said Adcock array two voltages varying at a frequency differing from the frequency of said arriving wave and having amplitudes proportional respectively to the cosine and to the sine of the angle at which said rotatable antenna is positioned with respect to a reference line of said array, two detectors connected to the diagonally opposing antenna pairs of said Adcock array to combine said cosine-proportional voltages and said sine-proportional voltages respectively to produce two voltages having amplitudes proportional respectively to the products of the amplitudes of said cosine-proportional voltages and said sine-proportional voltages, and varying at a frequency equal to the difference between the frequency of said local oscillator and that of said arriving wave, and an indicator connected with the output circuits of said detectors to indicate the sum of said beat frequency voltage amplitudes.

5. A device for determining an angle of which the sine and the cosine are respectively proportional to the amplitudes of two alternating voltages of the same frequency, including means for producing two voltages having a frequency differing from that of said first two voltages and having amplitudes proportional respectively to the cosine and to the sine of a second angle, means for varying said second angle to cause corresponding variations in said second two voltages, means for deriving a voltage proportional in amplitude to the product of the amplitudes of said first and second cosine-proportional voltages, means for deriving a voltage proportional in amplitude to the product of the amplitudes of said first and second sine-proportional voltages, means responsive to the sum of the amplitudes of said two product-proportional voltages and indicating when said sum is zero, and means for indicating the magnitude of said second angle when said last-mentioned sum is zero.

6. The method of determining the direction of arrival of an electromagnetic wave at a point, including the steps of deriving two voltages from said wave having magnitudes proportional respectively to the cosine and to the sine of the angle of arrival of said wave with respect to a reference direction, beating one of said voltages with an alternating voltage having an amplitude proportional to the cosine of a second angle, beating the other of said voltages with a voltage alternating at the same frequency as said first-named modulating voltage and having an amplitude proportional to the sine of said second angle, deriving the sum of the amplitudes of the resulting modulated product voltages, adjusting said second angle to a magnitude which results in said sum having a value of zero, and measuring said second angle.

DAVID G. C. LUCK.